United States Patent
Ho et al.

(10) Patent No.: US 8,743,430 B2
(45) Date of Patent: Jun. 3, 2014

(54) SCANNING DEVICE

(75) Inventors: Pei-Chi Ho, New Taipei (TW); Kwan Ho, New Taipei (TW)

(73) Assignees: Cal-Comp Electronics & Communications Company Limited., New Taipei (TW); Kimpo Electronics, Inc, New Taipei (TW)

( * ) Notice: Subject to any disclaimer, the term of this patent is extended or adjusted under 35 U.S.C. 154(b) by 51 days.

(21) Appl. No.: 13/551,598

(22) Filed: Jul. 17, 2012

(65) Prior Publication Data
    US 2013/0148175 A1    Jun. 13, 2013

(30) Foreign Application Priority Data
    Dec. 8, 2011    (TW) .............................. 100145334 A

(51) Int. Cl.
    *H04N 1/04* (2006.01)
(52) U.S. Cl.
    USPC ............ 358/498; 358/496; 358/474; 358/401
(58) Field of Classification Search
    USPC .................................. 358/498, 496, 474, 401
    See application file for complete search history.

(56) References Cited

U.S. PATENT DOCUMENTS

| 7,573,618 B2 * | 8/2009 | Tsai et al. ...................... 358/498 |
| 2011/0042883 A1 * | 2/2011 | Wang et al. ................... 271/3.17 |
| 2011/0157656 A1 * | 6/2011 | Liao .............................. 358/406 |

FOREIGN PATENT DOCUMENTS

TW    200507618    2/2005

\* cited by examiner

*Primary Examiner* — Houshang Safaipour
(74) *Attorney, Agent, or Firm* — Jianq Chyun IP Office

(57) ABSTRACT

A scanning device includes a body, a paper-feeding module, a scanning module and two transmission modules. The body has a paper-feeding area and a scanning area stacked with each other. The paper-feeding module is disposed at the paper-feeding area in the body and the scanning module is disposed at the scanning area in the body. One of the transmission modules is disposed within the paper-feeding area and electrically connected to the paper-feeding module so as to convey a document from the paper-feeding area to the scanning area, while another of the transmission modules is disposed within the scanning area and electrically connected to the scanning module so as to drive the scanning module for scanning images on the document.

12 Claims, 3 Drawing Sheets

SCANNING DEVICE

CROSS-REFERENCE TO RELATED APPLICATION

This application claims the priority benefit of Taiwan application serial no. 100145334, filed on Dec. 8, 2011. The entirety of the above-mentioned patent application is hereby incorporated by reference herein and made a part of this specification.

BACKGROUND OF THE INVENTION

1. Field of the Invention

The invention generally relates to a scanning device, and more particularly, to a scanning device with both a paper-feeding module and a scanning module.

2. Description of Related Art

A conventional multi-purpose scanning device is formed by combining a flatbed scanner and an automatic paper feeder, in which a document with a single sheet is scanned by solely using the flatbed scanner and a batch of documents is scanned by using both the automatic paper feeder and the flatbed scanner.

The above-mentioned conventional multi-purpose scanning device, although combining the automatic paper feeder and the flatbed scanner, but needs to employ two transmission modules independent from each other to finish the paper-feeding operation and the scanning operation. In other words, during the manufacturing and assembling process of a such multi-purpose scanning device, the operator is required to assemble two transmission modules corresponding to the paper-feeding module and the scanning module, which not only makes the assembling process more complex, bur also reduces the parts-sharing extent so as to increase the manufacturing cost of a scanning device.

SUMMARY OF THE INVENTION

Accordingly, the invention is directed to a scanning device, wherein the paper-feeding module and the scanning module have parts-sharing feature.

An embodiment of the invention provides a scanning device, which includes a body, a paper-feeding module, a scanning module and two transmission modules. The body has a scanning area and a paper-feeding area stacked thereon. The paper-feeding module is disposed at the paper-feeding area in the body and the scanning module is disposed at the scanning area in the body. One of the transmission modules is disposed within the paper-feeding area and electrically connected to the paper-feeding module so as to convey a document from the paper-feeding area to the scanning area, while another of the transmission modules is disposed within the scanning area and electrically connected to the scanning module so as to drive the scanning module for scanning images on the document.

In an embodiment of the present invention, each of the above-mentioned transmission modules includes a base, a motor and a set of gears. The base is configured for being disposed at the paper-feeding area or the scanning area. The motor is disposed on the base. The set of gears is coupled between the motor and the paper-feeding module/the scanning module.

In an embodiment of the present invention, the above-mentioned motor and the set of gears are at two opposite sides of the base.

In an embodiment of the present invention, the above-mentioned set of gears includes a plurality of driven gears partially overlapped and coupled with each other.

In an embodiment of the present invention, the above-mentioned base has a recess, and one of the driven gears is disposed in the recess and at the back of the motor.

In an embodiment of the present invention, each of the above-mentioned the driven gears has two gear rings coaxial and superimposed with each other.

In an embodiment of the present invention, the set of gears of the above-mentioned transmission module coupled to the paper-feeding module is located beside the feeding path of the document.

In an embodiment of the present invention, the set of gears of the above-mentioned transmission module coupled to the scanning module is located below the moving path of the scanning module.

Based on the description above, in the above-mentioned embodiment of the invention, since the transmission module for driving the scanning module and the transmission module for driving the paper-feeding module have the same part structures and the relative layout of the parts both able to be assembled at the paper-feeding area or the scanning area, so that the parts-sharing extent is increased, which can simplify the assembling operations in the process and effectively reduce the manufacturing cost thereof.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
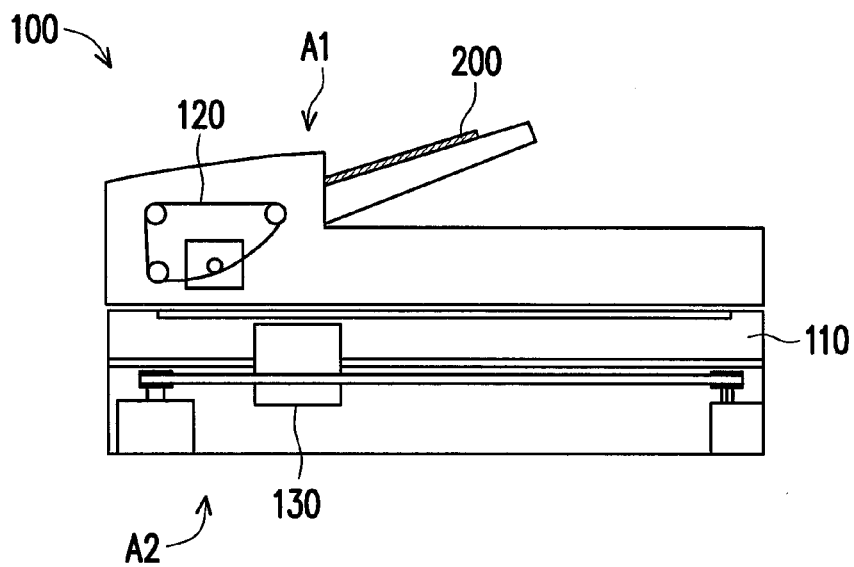
FIG. 1 is a schematic diagram of a scanning device according to an embodiment of the invention.
Figure 2:
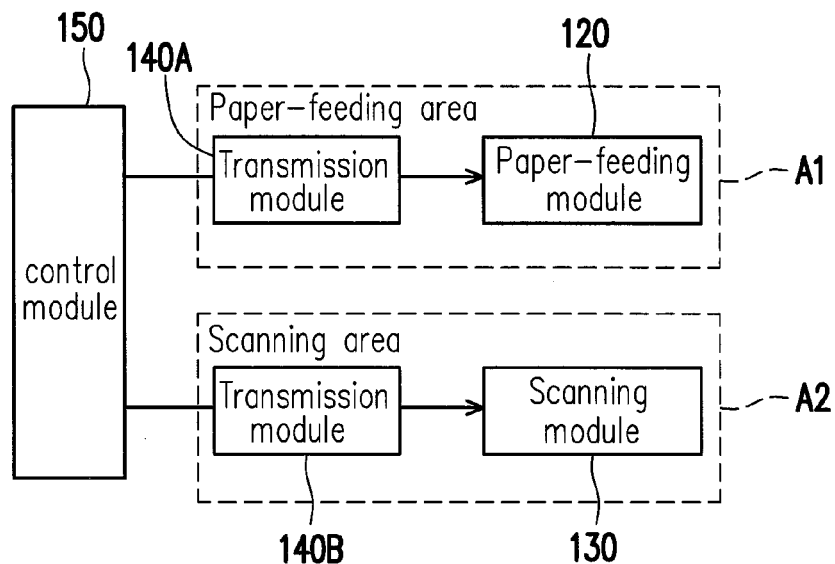
FIG. 2 is a block diagram of each module in the scanning device of FIG. 1.

FIG. 1 is a schematic diagram of a scanning device according to an embodiment of the invention and FIG. 2 is a block diagram of each module in the scanning device of FIG. 1. Referring to FIGS. 1 and 2, in the embodiment, a scanning device 100 includes a body 110, a paper-feeding module 120 and a scanning module 130. The body 110 has a paper-feeding area A1 and a scanning area A2 stacked under the paper-feeding area A1. The paper-feeding module 120 is disposed in the body 110 and located at the paper-feeding area A1. The scanning module 130 is disposed in the body 110 and located at the scanning area A2. A document 200 is suitable to enter the scanning area A2 from the paper-feeding area A1 through the driving of the paper-feeding module 120, and further, the scanning module 130 scans images on the document 200.

It should be noted that in order to make the above-mentioned paper-feeding module 120 and scanning module 130 smoothly running, the scanning device 100 further includes two transmission modules 140A and 140B, in which the transmission module 140A is disposed at the paper-feeding area A1 in the body 110 and electrically connected to the paper-feeding module 120 so as to drive the paper-feeding module 120 for feeding the document 200. Another transmission module 140B is disposed at the scanning area A2 in the body 110 so as to drive the scanning module 130 for scanning the document 200. In addition, a control module 150 is employed and electrically connected to both the transmission module 140A and the transmission module 140B so as to smoothly drive the two transmission modules for conducting the corresponding paper-feeding operation and scanning operation.

Figure 3:
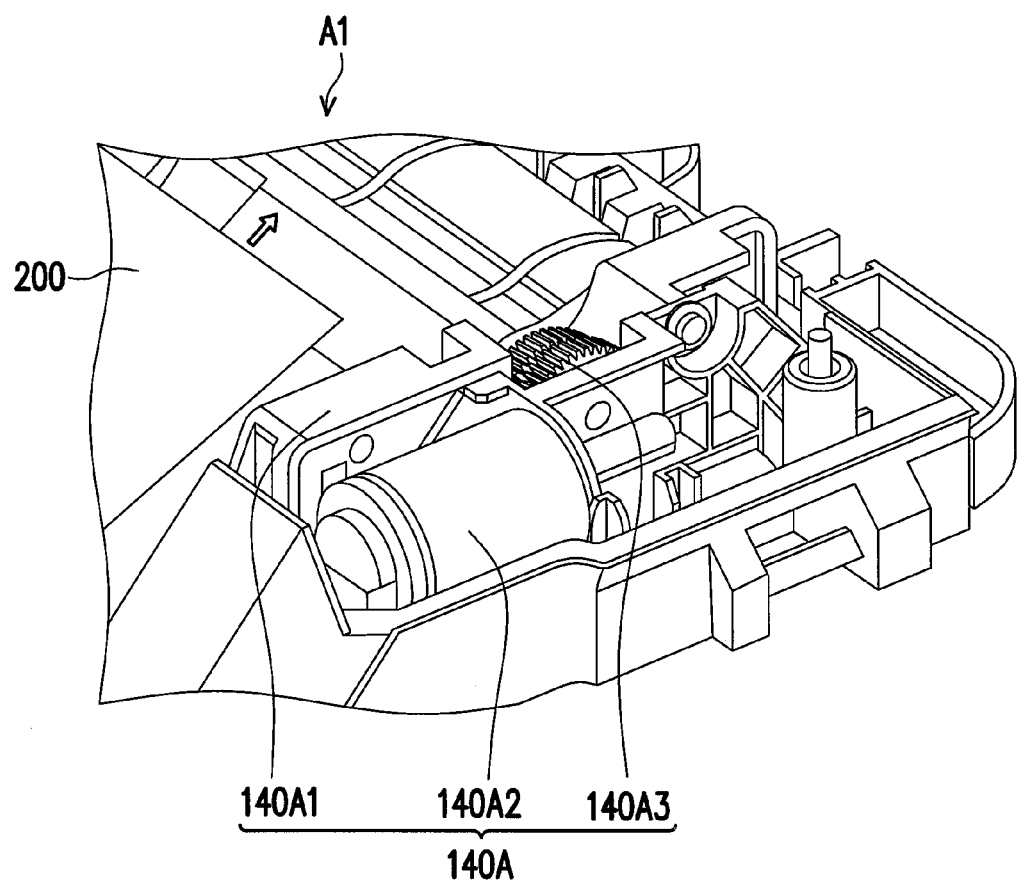
FIG. 3 is a three-dimensional diagram of the parts of the scanning device of FIG. 1 at the paper-feeding area.
Figure 4:
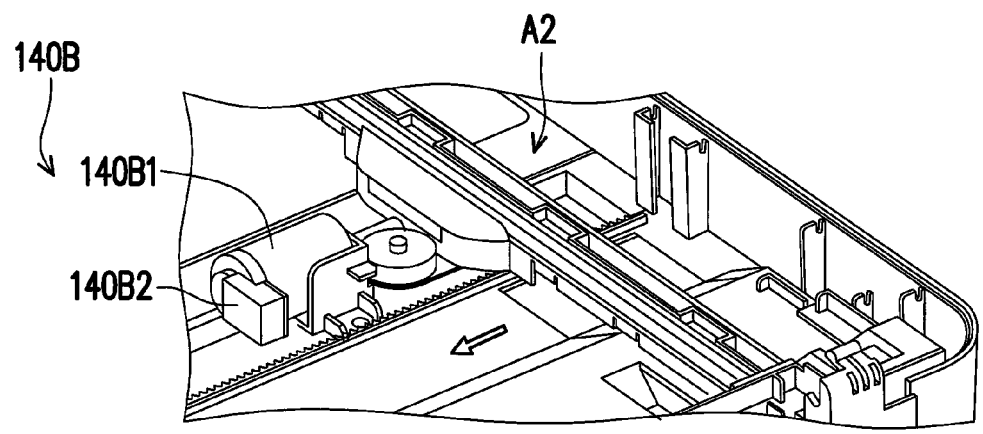
FIG. 4 is a three-dimensional diagram of the parts of the scanning device of FIG. 1 at the scanning area.
Figure 5:
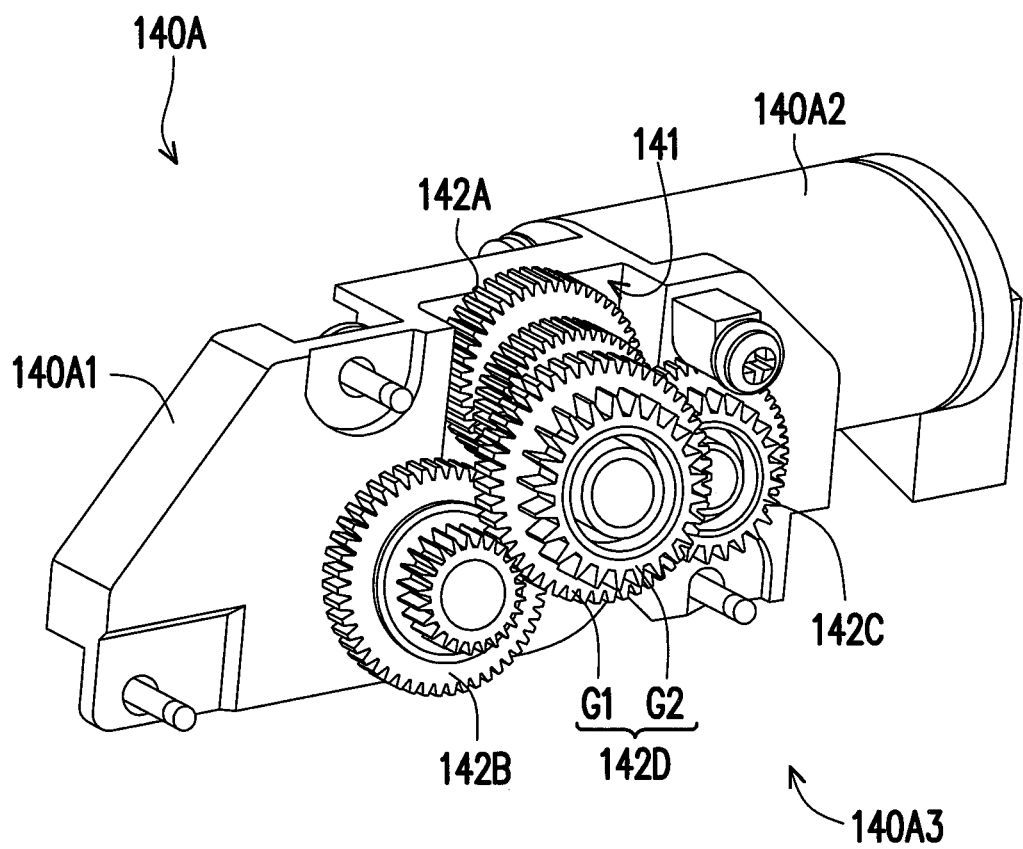
FIG. 5 is a schematic diagram of a transmission module of FIG. 3.

FIG. 3 is a three-dimensional diagram of the parts of the scanning device of FIG. 1 at the paper-feeding area, FIG. 4 is a three-dimensional diagram of the parts of the scanning device of FIG. 1 at the scanning area and FIG. 5 is a schematic diagram of a transmission module of FIG. 3. It should be noted that the parts and the layouts of the two transmission modules 140A and 140B in the scanning device 100 are the same, in following, only the transmission module 140A is depicted in FIG. 5. Referring to FIGS. 3-5, in the embodiment, the transmission module 140A includes a base 140A1, a motor 140A2 and a set of gears 140A3, in which the base 140A1 is disposed at the paper-feeding area A1, the motor 140A2 is disposed on the base 140A1 and the set of gears 140A3 is coupled between the motor 140A2 and the paper-feeding module 120. In the same way, the base 140B1, the motor 140B2 and the set of gears (not shown) of the transmission module 140B are located within the scanning area A2.

In more details, the transmission module 140A of the paper-feeding module 120 is located beside the feeding path of the document 200, while the transmission module 140B of the scanning module 130 is located below the moving path of the scanning module 130. Except the above-mentioned points, the transmission modules 140A and 140B have no other differences of the structure or part layout.

Referring to FIG. 5 again, in the embodiment, the set of gears 140A3 and the motor 140A2 are respectively located at the two opposite sides of the base 140A1, in which the base 140A1 has a recess 141, the set of gears 140A3 includes a plurality of driven gears 142A, 142B, 142C and 142D coupled to each other and the driven gear 142A is located in the recess 141 and at the back of the motor 140A2. The driven gears 142A, 142B, 142C and 142D are partially overlapped. Each of the driven gears 142A, 142B, 142C and 142D has two gear rings G1 and G2 coaxial and superimposed with each other (herein, only the gear rings G1 and G2 of the driven gear 142D are exemplarily described), and through the two gear rings G1 and G2, the motor 140A2 can smoothly drive the paper-feeding module 120 or the scanning module 130. The invention does not limit the structures for the transmission modules 140A and 140B to respectively drive the paper-feeding module 120 or the scanning module 130. For example, the transmission module 140A can use the gear 142A or 142C to couple the paper-feeding roller (not shown) of the paper-feeding module 120. On the other hand, the transmission module 140B can use the same part to couple the driving belt (not shown) of the scanning module 130.

The embodiment does not limit the structure types of each part in the transmission modules 140A and 140B. Once the parts and the layouts of the two transmission modules 140A and 140B in the scanning device 100 are the same, any available and appropriate driving parts, for example, cam and belt, can be used in the embodiment.

In summary, in the above-mentioned embodiment of the invention, the scanning device 100 has two same transmission modules 140A and 140B, which respectively drive the paper-feeding module 120 or the scanning module 130 correspondingly connected to the modules so as to achieve the corresponding operation. In this way, the assembler on the production line have no need to waste time for identifying the difference between the transmission modules 140A and 140B during assembling the scanning device 100. In other words, by simplifying the design of the parts, the invention can effectively avoid assembling fault and therefore to simplify the assembling process and advance the assembling efficiency. In addition, the design with simplified parts means the types of the inventory get simplified. Such design through sharing the transmission modules 140A and 140B between each other can enhance its applicability in the maintenance and thereby effectively reduce the manufacturing cost of the scanning device 100.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A scanning device, comprising:
    a body, having a paper-feeding area and a scanning area stacked with each other;
    a paper-feeding module, disposed at the paper-feeding area in the body;
    a scanning module, disposed at the scanning area in the body; and
    two transmission modules, wherein one of the transmission modules is disposed within the paper-feeding area and electrically connected to the paper-feeding module so as to convey a document from the paper-feeding area to the scanning area, and another of the transmission modules is disposed within the scanning area and electrically connected to the scanning module so as to drive the scanning module for scanning images on the document,
    wherein each of the transmission modules comprises:
        a base, configured for being disposed at the paper-feeding area or the scanning area;
        a motor, disposed on the base; and
        a set of gears, coupled between the motor and the paper-feeding module/the scanning module, wherein the set of gears of the transmission module coupled to the scanning module is located below a moving path of the scanning module.

2. The scanning device as claimed in claim 1, wherein the set of gears and the motor are at two opposite sides of the base.

3. The scanning device as claimed in claim 1, wherein the set of gears comprises a plurality of driven gears partially overlapped and coupled with each other.

4. The scanning device as claimed in claim 3, wherein the base has a recess, and one of the driven gears is disposed in the recess and faces back the motor.

5. The scanning device as claimed in claim 3, wherein each of the driven gears has two gear rings coaxial and superimposed with each other.

6. The scanning device as claimed in claim 1, wherein the set of gears of the transmission module coupled to the paper-feeding module is located beside a feeding path of the document.

7. A scanning device, comprising:
    a body, having a paper-feeding area and a scanning area stacked with each other;

a paper-feeding module, disposed at the paper-feeding area in the body;

a scanning module, disposed at the scanning area in the body; and two transmission modules, wherein one of the transmission modules is disposed within the paper-feeding area and electrically connected to the paper-feeding module so as to convey a document from the paper-feeding area to the scanning area, and another of the transmission modules is disposed within the scanning area and electrically connected to the scanning module so as to drive the scanning module for scanning images on the document, wherein each of the transmission modules comprises:

a base, configured for being disposed at the paper-feeding area or the scanning area;

a motor, disposed on the base; and a set of gears, coupled between the motor and the paper-feeding module/the scanning module, wherein the set of gears of the transmission module coupled to the paper-feeding module is located beside a feeding path of the document.

8. The scanning device as claimed in claim 7, wherein the set of gears and the motor are at two opposite sides of the base.

9. The scanning device as claimed in claim 7, wherein the set of gears comprises a plurality of driven gears partially overlapped and coupled with each other.

10. The scanning device as claimed in claim 9, wherein the base has a recess, and one of the driven gears is disposed in the recess and faces back the motor.

11. The scanning device as claimed in claim 9, wherein each of the driven gears has two gear rings coaxial and superimposed with each other.

12. The scanning device as claimed in claim 7, wherein the set of gears of the transmission module coupled to the scanning module is located below a moving path of the scanning module.

* * * * *

UNITED STATES PATENT AND TRADEMARK OFFICE
CERTIFICATE OF CORRECTION

| | | |
|---|---|---|
| PATENT NO. | : 8,743,430 B2 | Page 1 of 1 |
| APPLICATION NO. | : 13/551598 | |
| DATED | : June 3, 2014 | |
| INVENTOR(S) | : Ho | |

It is certified that error appears in the above-identified patent and that said Letters Patent is hereby corrected as shown below:

On the title page, item [73]

"Kimpo Electronics, Inc" should read -- Kinpo Electronics, Inc. --.

Signed and Sealed this
Twelfth Day of August, 2014

Michelle K. Lee
*Deputy Director of the United States Patent and Trademark Office*